US009438598B2

(12) United States Patent
Feuer et al.

(10) Patent No.: US 9,438,598 B2
(45) Date of Patent: Sep. 6, 2016

(54) SECURELY UPDATING INFORMATION IDENTIFYING SERVICES ACCESSIBLE VIA KEYS (71) Applicant: Verizon Patent and Licensing Inc., Basking Ridge, NJ (US)

(72) Inventors: David Feuer, New Milford, NJ (US); Thaddeus J. Dudziak, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 325 days.

(21) Appl. No.: 14/063,466

(22) Filed: Oct. 25, 2013

(65) Prior Publication Data
US 2014/0237553 A1 Aug. 21, 2014

Related U.S. Application Data (63) Continuation-in-part of application No. 13/768,306, filed on Feb. 15, 2013.

(51) Int. Cl.
*H04L 29/06* (2006.01)

(52) U.S. Cl.
CPC ........... *H04L 63/10* (2013.01); *H04L 63/0807* (2013.01)

(58) Field of Classification Search
CPC ................................ H04L 63/10; H04L 9/00
See application file for complete search history.

(56) References Cited

U.S. PATENT DOCUMENTS

| 6,647,494 | B1 | 11/2003 | Drews |
| 6,668,322 | B1 | 12/2003 | Wood et al. |
| 7,240,214 | B2 | 7/2007 | Gazzetta et al. |
| 7,366,303 | B2 | 4/2008 | Flykt et al. |
| 7,890,084 | B1 | 2/2011 | Dudziak et al. |
| 7,984,488 | B2 | 7/2011 | Cross et al. |
| 8,032,165 | B2 | 10/2011 | Dudziak et al. |
| 8,099,765 | B2 | 1/2012 | Parkinson |
| 8,474,017 | B2 | 6/2013 | Schultz et al. |
| 8,532,621 | B2 | 9/2013 | Plestid et al. |
| 8,539,558 | B2 | 9/2013 | Radhakrishnan et al. |
| 8,539,559 | B2 | 9/2013 | Nakhjiri |
| 8,683,560 | B1 | 3/2014 | Brooker et al. |
| 9,183,361 | B2 * | 11/2015 | Obasanjo ............ G06F 21/6218 |
| 2004/0123313 | A1 * | 6/2004 | Koo ....................... H04N 7/163 725/31 |
| 2008/0046982 | A1 | 2/2008 | Parkinson |
| 2008/0046984 | A1 | 2/2008 | Bohmer et al. |
| 2009/0271870 | A1 * | 10/2009 | Vepsalainen ............ G06F 21/33 726/27 |
| 2011/0041167 | A1 | 2/2011 | Nguyen |
| 2011/0314533 | A1 * | 12/2011 | Austin .................... H04L 63/08 726/9 |

OTHER PUBLICATIONS

D. Hardt, Ed., "The OAuth 2.0 Authorization Network", RFC 6749, Internet Engineering Task Force (IETF), Microsoft, Oct. 2012, 152 pages.

\* cited by examiner

*Primary Examiner* — Jayesh Jhaveri
*Assistant Examiner* — Wasika Nipa (57) ABSTRACT

A first device may receive a service authorization instruction from a second device. The service authorization instruction may include one or more authorization parameters and an instruction to associate or disassociate a key, with a service, to permit or prevent the service to be accessed using the key. The key may be embedded in an application used to provide an application instruction corresponding to a request for the service. The first device may validate the service authorization instruction based on the one or more authorization parameters; and update, based on validating the service authorization instruction, information identifying services that are accessible using the key to permit or prevent the service to be accessed using the key without modifying the key embedded in the application.

20 Claims, 8 Drawing Sheets

SECURELY UPDATING INFORMATION IDENTIFYING SERVICES ACCESSIBLE VIA KEYS

RELATED APPLICATION

This application claims priority from and is a continuation-in-part (CIP) of U.S. patent application Ser. No. 13/768,306, filed Feb. 15, 2013, entitled "SECURE ACCESS CREDENTIAL UPDATING," the disclosure of which is incorporated herein by reference.

BACKGROUND

An application server can access a network provider server using a set of credentials (e.g., including a key and/or some other information) embedded in an application of the application server. The key may be associated with a particular set of services that the application server may access. The network provider server may provide a particular service (e.g., a location identification service for a user device) via the application in response to a request for the particular service and based on the set of credentials provided by the application server. In order to modify the services that the application server may access (e.g., to permit the application server to access additional services or fewer services), the key in the application may need to be modified. Modifying the key may require obtaining a new key, corresponding to the modified services, and embedding the new key in the application. Once the new key has been obtained and embedded, the application may need to undergo redeployment and retesting activities that may be time-consuming and costly.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may update information that associates a key, embedded in an application, with services that the application may access using the key (e.g., via an application server and from a network provider server). As a result, the application may access additional or fewer services without the need to request a new key, embed the new key in the application, retest, redeploy, and/or perform other tasks relating to modifying the key embedded in the application.

Figure 1:
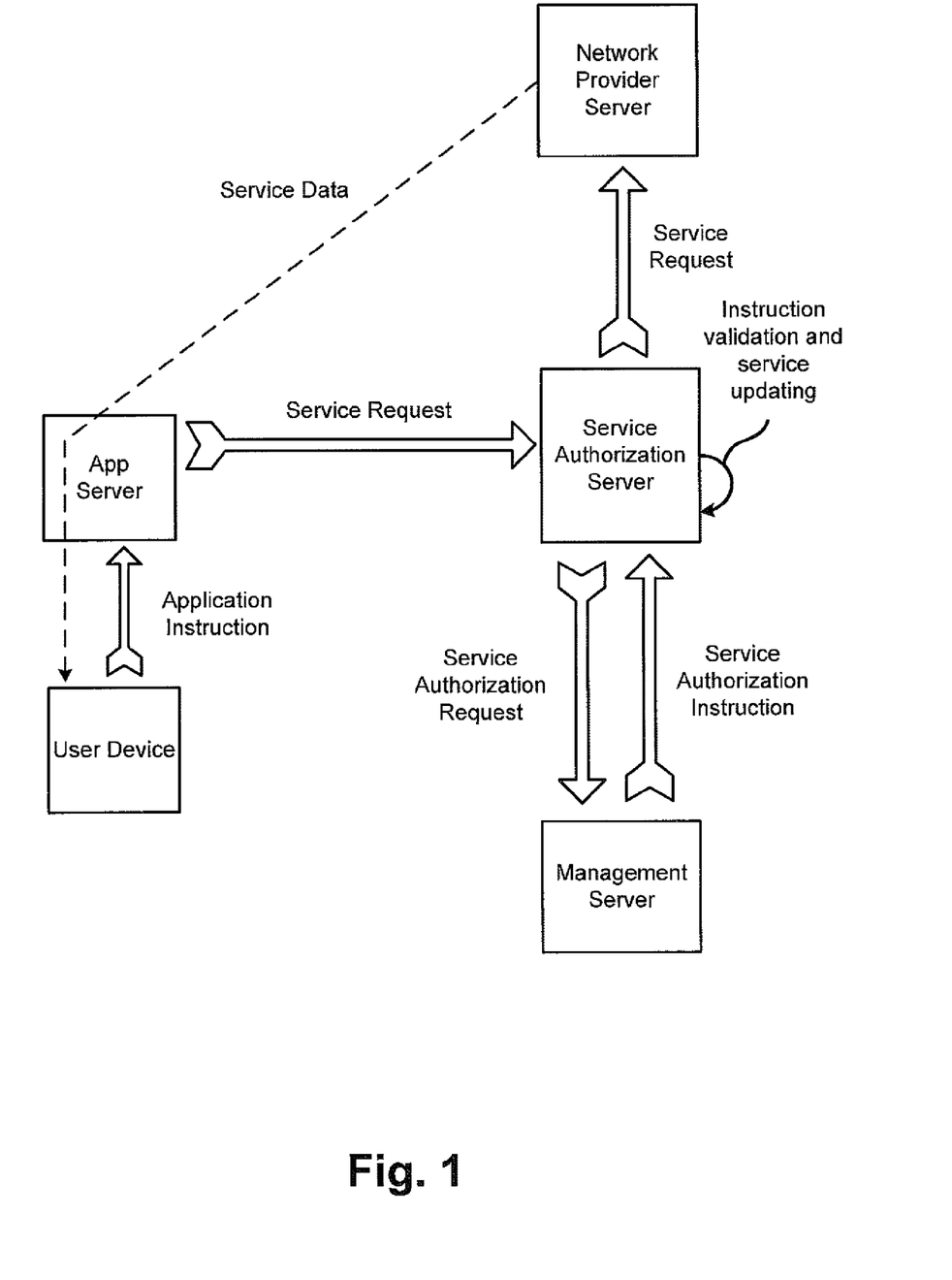
FIG. 1 illustrates an example overview of an implementation described herein.

FIG. 1 illustrates an example overview of an implementation described herein. As shown in FIG. 1, a user device may provide an application instruction to an application server (hereinafter referred to as an "app server) in order to perform a task via an application executing on the user device. For example, the application instruction may include an instruction to send/receive messages between user devices, locate a user device, receive geographic mapping data, etc. Based on receiving the application instruction from the user device, the app server may provide a service request towards a network provider server to request a service (e.g., a service to send/receive messages between user devices, a service to locate a user device, etc.) in order to receive service data relating to the application instruction and to provide the user device with data in connection with the application instruction.

In some implementations, the service request may include information identifying the requested service, the app server, credentials, and/or a key embedded in the application used by the user device to provide the application instruction to the app server. In some implementations, the credentials may be used to authorize the app server to communicate with the network provider server and access the service. In some implementations, a service authorization server may receive the service request and determine whether the app server is authorized to receive the service (e.g., based on the credentials and the key). For example, the service authorization server may store a data structure that identifies services that are associated with the key and that may be accessed using the key.

In FIG. 1, assume that the service authorization server identifies that the key is not associated with the requested service identified in the service request (e.g., when the application instruction requests a service that was not originally authorized to be accessed using the key embedded in the application). Given this assumption, the service authorization server may provide a service authorization request to a management device. In some implementations, the management device may receive the service authorization request and may provide a service authorization instruction that includes an instruction to authorize the service (e.g., generate an association between the requested service and the key).

In some implementations, the service authorization instruction may further include authorization parameters that may be used by the service authorization server to validate the service authorization instruction received by the management device. For example, the authorization parameters may include a username, a password, information identifying an internet protocol (IP) address associated with the service authorization instruction, information identifying a geographic location at which the service authorization instruction was provided, information identifying biometrics information of a user that provided the service authorization instruction via the management device, and/or some other information that may be used to validate that the service authorization instruction was provided by an authorized party.

In some implementations, the service authorization server may validate the service authorization instruction and may update a data structure to associate the key with the requested service (e.g., such that the key may be used to access the service). Further, the service authorization server may provide the service request to the network provider server. The network provider server may receive the service request, and provide service data (e.g., data relating to the application instruction provided by the user device).

In some implementations, the management device may provide a service authorization instruction at any time even without receiving a service authorization request. For example, the management device may provide the service authorization instruction to direct the service authorization server to activate a service (e.g., to generate an association between the key and the service to be activated) to permit the app server to access the service that the app server may not currently be able to access. In some implementations, the service authorization instruction may include an instruction to direct the service authorization server to deactivate a service (e.g., by removing an association between the key and the service to be deactivated). In some implementations, a service may be deactivated to reduce costs associated with allowing access to the service. That is, the service authorization instruction may instruct the service authorization server to update information that associates a key with services that an app server, associated with an application that executes on a user device, may access using the key.

In some implementations, the information that associates services with a particular key may be updated as part of a testing and development phase of the application such that the key may be associated with services that an application developer may wish to implement into the application. Additionally, or alternatively, the information that associates the services with a particular key may be updated after the application has been released and may be updated in response to an instruction from an end-user who may select to receive a service (e.g., in exchange for payment).

As a result, information identifying services that an app server may access may be updated without the need to modify the key embedded in the application, thereby eliminating the need to issue a new key associated with the services, embed the new key in the application, redeploy the application, retest the application, or perform some other task relating to updating the key embedded in the application that may be time-consuming and costly. Further, a service authorization instruction may be validated based on biometrics information, IP address information, geographic location information, and/or some other information to ensure that the authorization instruction is received from an authorized party.

Figure 2:
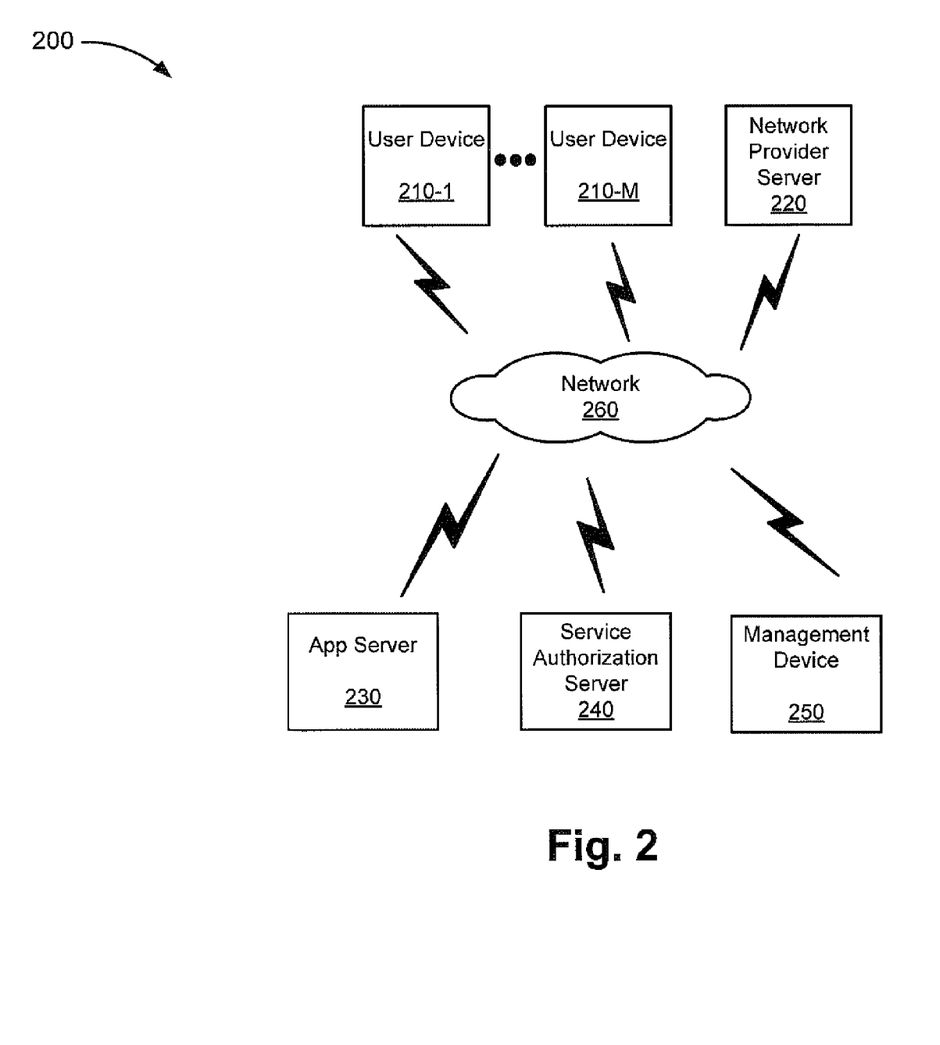
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), network provider server 220, application (app) server 230, service authorization server 240, management device 250, and network 260.

User device 210 may include any device capable of communicating via a network, such as network 260. For example, user device 210 may correspond to a mobile communication device (e.g., a smart phone or a personal digital assistant (PDA)), a portable computer device (e.g., a laptop or a tablet computer), a gaming device, a machine-to-machine device, or another type of device. In some implementations, user device 210 may communicate with app server 230 (e.g., via an application) to provide an application instruction and to receive service data corresponding to a service requested by user device 210 via the application instruction (e.g., a location identification service to identify a location of user device 210, a click-to-call server, a video chat service, a geographic mapping service to receive information regarding a geographic region, such as road maps, traffic maps, directory information, etc., and/or some other type of service).

Network provider server 220 may include a computing device, such as a server device, or a collection of server devices. In some implementations, network provider server 220 may store service data which app server 230 may access to provide a service to user device 210. For example, network provider server 220 may store information associated with multiple user devices 210, such as location information, account information, billing information, network access permissions information, user device type information, or some other information regarding user devices 210.

App server 230 may include a computing device, such as a server device, or a collection of server devices. In some implementations, app server 230 may implement one or more applications used to provide a service to user device 210 or to some other device. In some implementations, an application may include credentials and/or a key, embedded in the application, used to access network provider server 220 to access service data in connection with providing the service to user device 210. In some implementations, app server 230 may provide a service request towards network provider server 220 in order to receive service data. In some implementations, the service request may identify a requested service (e.g., corresponding to particular service data), the credentials, and/or the key.

Service authorization server 240 may include a computing device, such as a server device, or a collection of server devices. In some implementations, service authorization server 240 may receive a service request from app server 230, authorize the service request by determining that app server 230 may receive service data corresponding to the service request, and provide the service request to network provider server 220 such that app server 230 may receive the service data. For example, service authorization server 240 may authorize the service request when credentials, included in the service request, match credentials stored by service authorization server 240. Further, service authorization server 240 may authorize the service request when the key, included in the service request, authorizes access to the requested services. For example, service authorization server 240 may store information that associates the key with services that may be obtained using the key.

In some implementations, service authorization server 240 may receive a service authorization instruction from management device 250 (e.g., based on providing the service authorization request or at any other time). In some implementations, service authorization server 240 may update information that associates a key with authorized services based on receiving the service authorization instruction and validating the service authorization instruction (e.g., to verify that the service authorization instruction was received from an authorized party).

Management device 250 may include a computing device, such as a server device, or a collection of server devices. Additionally, or alternatively, management device 250 may include a mobile communication device (e.g., a smart phone or a PDA), a portable computer device (e.g., a laptop or a tablet computer), a desktop device, or another type of device. In some implementations, management device 250 may provide a service authorization instruction to service authorization server 240 to update an association between a key and a service that may be provided to app server 230 using the key. For example, the service authorization instruction may direct service authorization server 240 to activate a service for a key (e.g., to generate an association between the key and the service that is to be activated). Additionally, or alternatively, the service authorization instruction may direct service authorization server 240 to deactivate a service (e.g., to disassociate the key and the service that is to be deactivated).

In some implementations, the service authorization instruction may include credentials, such as a username, a password, information identifying an IP address via which the service authorization instruction was sent, biometrics information, geographic location information from which the service authorization instruction was sent, and/or some other credentials that may be used by service authorization server 240 to validate that the service authorization instruction was provided by an authorized party.

In some implementations, app server 230 may function as management device 250. For example, app server 230 may provide a service authorization instruction to service authorization server 240 in response to receiving a request for service from user device 210. In some implementations, user device 210 may request access to a service in exchange for payment.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another type of network. Additionally, or alternatively, network 260 may include a local area network (LAN), a wide area network (WAN), a metropolitan network (MAN), a telephone network (e.g., the Public Switched Telephone Network (PSTN)), an ad hoc network, a managed IP network, a virtual private network (VPN), a peer-to-peer network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
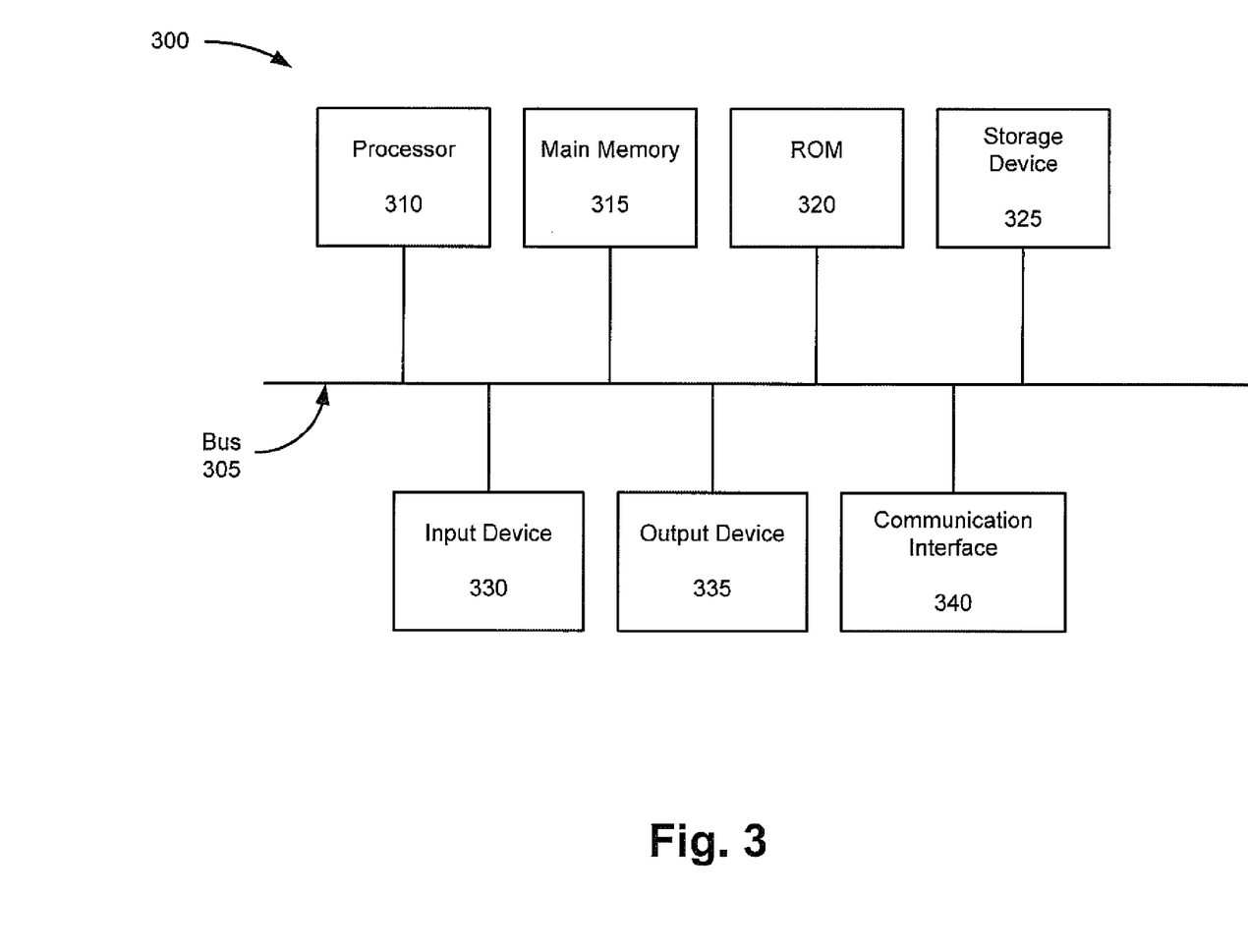
FIG. 3 illustrates example components of a device that may be used within the environment of FIG. 2.

FIG. 3 illustrates example components of a device 300 that may be used within environment 200 of FIG. 2. Device 300 may correspond to user device 210, network provider server 220, app server 230, service authorization server 240, and/or management device 250. Each of user device 210, network provider server 220, app server 230, service authorization server 240, and/or management device 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
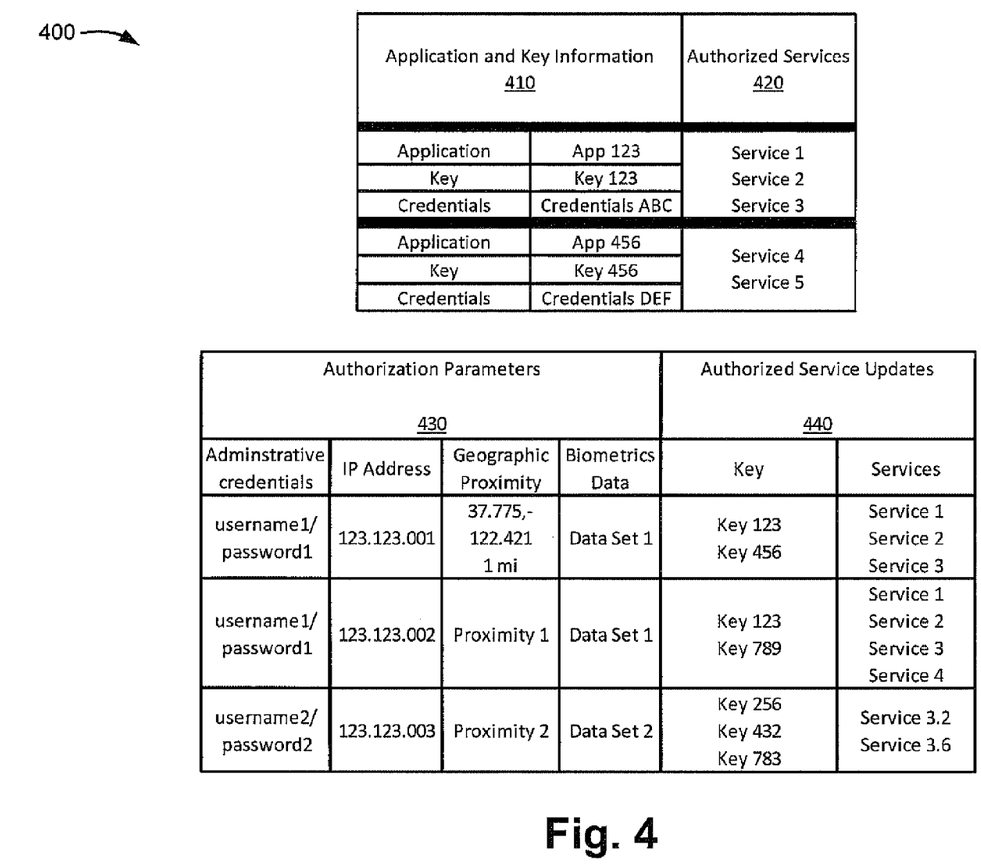
FIG. 4 illustrates an example data structure that may be stored by one or more devices in the environment of FIG. 2.

FIG. 4 illustrates an example data structure 400 that may be stored by one or more devices in environment 200, such as service authorization server 240. In some implementations, data structure 400 may be stored in a memory of service authorization server 240. In some implementations, data structure 400 may be stored in a memory separate from, but accessible by, service authorization server 240. In some implementations, data structure 400 may be stored by some other device in environment 200, such as network provider server 220, app server 230, and/or management device 250. A particular instance of data structure 400 may contain different information and/or fields than another instance of data structure 400.

As shown in FIG. 4, data structure 400 may include application and key information field 410, authorized services field 420, authorization parameters field 430, and authorized service updates field 440.

Application and key information field 410 may store information identifying an application (e.g., an application associated with app server 230 and used by user device 210 to request service data) and a key embedded in the application. Further, application and key information field 410 may store information identifying credentials, embedded in the application, that may be used to access network provider server 220 to receive service data. As an example, application and key information field 410 may store information identifying the application "App 123" and a key (e.g., "Key 123") and credentials (e.g., "Credentials ABC") associated with the application.

In some implementations, the key may include a string of characters of any format and length. In some implementations, the key may be encrypted. In some implementations, the key may be unencrypted. In some implementations, the key may be a token, an OAuth key, or the like.

Authorized services field 420 may store information identifying services that may be accessed using the key embedded within the application. For example, when Service 1, Service 2, and Service 3 are authorized to be accessed using Key 123, authorized services field 420 may store information identifying Service 1, Service 2, and Service 3 corresponding to Key 123. In some implementations, service authorization server 240 may authorize a service request, received from app server 230, to access service data from network provider server 220.

As an example, assume that a service request includes Key 123 and a request to access Service 1. Given these assumptions, and based on information stored by application and key information field 410 and authorized services field 420, service authorization server 240 may authorize the service request and provide the service request to network provider server 220 (e.g., since Service 1 is associated with Key 123). As another example, assume that a service request includes Key 123 and a request to access Service 4. Given these assumptions, and based on information stored by application and key information field 410 and authorized services field 420, service authorization server 240 may not authorize the service request (e.g., since Service 4 is not associated with Key 123).

In some implementations, information stored by authorized services field 420 may be updated to activate or deactivate a service associated with a particular key (e.g., such that the key can be used to access an activated service or may not be used to access a deactivated service). For example, information stored by authorized services field 420 may be updated based on receiving a service authorization instruction and validating the service authorization instruction. In some implementations, a service authorization instruction may include an instruction to update a service associated with a key and authorization parameters to validate that the service authorization instruction is received by an authorized party (e.g., a username, a password, an IP address via which the service authorization instruction is received, a geographic location from which the service authorization instruction is received, biometrics information, and/or some other information that may be used to validate the service authorization instruction).

Authorization parameters field 430 and authorized service updates field 440 may include information that may be used to validate a service authorization instruction. For example, service authorization server 240 may validate a service authorization instruction when authorization parameters, included in the service authorization instruction, match the authorization parameters stored by authorization parameters field 430. Further, service authorization server 240 may validate the service authorization instruction when the service authorization instruction includes an instruction to update a service, for a particular key, that is authorized to be updated (e.g., based on information stored by authorized service updates field 440).

As shown in FIG. 4, authorization parameters field 430 may include administrative credentials, such as a username, a password, and/or some other information to verify a requester, associated with management device 250. In some implementations, authorization parameters field 430 may further include an IP address (and/or some other network address).

In some implementations, authorization parameters field 430 may also include information identifying a geographic proximity (e.g., information identifying a radius and a geographic location, such as longitude/latitude coordinates or some other measure of geographic location) within which a service authorization instruction may be validated (e.g., a geographic proximity associated with a home or office location of an operator of management device 250, a data center associated with management device 250, and/or some other location). In some implementations, the information identifying a geographic proximity may include information identifying a geographic address, a zip code, a city, a town, a state, a county, a country and/or some other geographic location or region. In some implementations, the information identifying the geographic proximity may relate to a location of management device 250. In an example shown in FIG. 4, authorization parameters field 430 may store information identifying a radius from the geographic location identified by longitude/latitude coordinates 37.775, −122.421.

In some implementations, authorization parameters field 430 may include a data set relating to biometrics data, such as data relating to a fingerprint, a retina scan, a voice print, and/or some other biometrics-related data. For example, authorization parameters field 430 may store Data Set 1 that includes biometrics data associated with a particular operator, or set of operators, of management device 250.

In some implementations, authorization parameters field 430 may include some other information that may be used to authorize a service authorization instruction, such as a device identifier, associated with management device 250, such as a unique device identifier (UDID), an International Mobile Station Equipment Identity (IMEI), an open device identification number (ODIN), or the like. Additionally, or alternatively, authorization parameters field 430 may include a computer file (e.g., a certificate file, an authentication file, or the like) that may be used to validate an authorization instruction.

Authorized service updates field 440 may store information identifying services are available for one or more keys and that may be activated or deactivated. For example, authorized service updates field 440 may identify services that may be activated or deactivated for the one or more keys when authorization parameters, included in a service authorization instruction, match a corresponding set of authorization parameters in authorization parameters field 430.

As an example, assume that a service authorization request includes administrative credentials (e.g., username1/ password1), information identifying the IP Address "123.123.001," information identifying a geographic location within a one kilometer radius of the longitude/latitude coordinates of "37.775, −122.421," and biometrics data corresponding to "Data Set 1." Further, assume that the service authorization instruction includes an instruction to update Service 1, Service 2, and/or Service 3 for Key 123 and/or Key 456. Given these assumptions, service authorization server 240 may validate the service authorization request.

As further shown in FIG. 4, different services for different keys may be updated when the same administrative credentials are provided as part of a service authorization request. For example, when username1 and password1 are provided, but at different locations and via different IP address, different services may be updated for different keys. In the example shown in FIG. 4, Service 1, Service 2, and/or Service 3 for Key 123 and/or Key 456 may be updated when a service request includes the administrative credentials (e.g., username1/password1), information identifying the IP Address "123.123.001", information identifying a geographic location within a one kilometer radius of the longitude/latitude coordinates of "37.775, −122.421," and biometrics data corresponding to "Data Set 1." When the same administrative credentials are provided, but via a different IP address (e.g., "123.123.002") and from within a different geographic proximity (e.g., "Proximity 1"), a different set of services for a different set of keys may be updated.

That is, for a particular operator associated with particular administrative credentials (e.g., "username1/password1"), different services for different keys may be updated based on the geographic location from which the service authorization instruction was provided, the IP address via which the service authorization instruction was provided, and/or based on some other authorization parameter.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
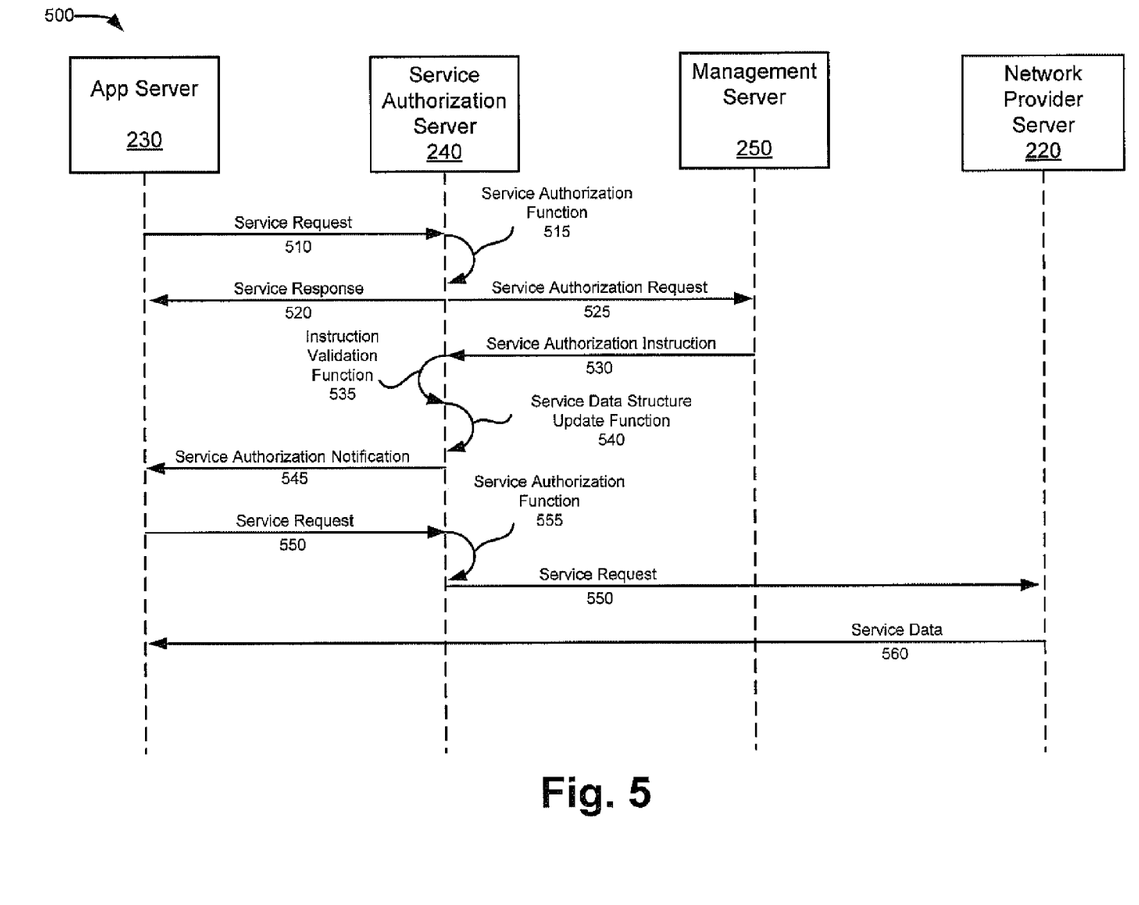
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include network provider server 220, app server 230, service authorization server 240, and management device 250. Network provider server 220, app server 230, service authorization server 240, and management device 250 may include components and/or perform functions described above in connection with, for example, one or more of FIGS. 1-3. Portion 500 may include example operations for updating a service for a particular key.

As shown in FIG. 5, app server 230 may provide service request 510 to service authorization server 240. For example, app server 230 may provide service request 510 based on receiving an application instruction from user device 210 (e.g., an instruction associated with performing a task via an application of user device 210 and associated with app server 230). In some implementations, service request 510 may identify a requested service corresponding to the application instruction (e.g., a geographic map service, a user device location service, etc.). In some implementations, service request 510 may include credentials and a key embedded within the application.

In some implementations, service authorization server 240 may receive service request 510 and may perform service authorization function 515 to authorize service request 510. For example, service authorization server 240 may authorize service request 510 based determining that the credentials are valid (e.g., when the credentials in service request 510 match credentials stored by service authorization server 240). In some implementations, authorization server 240 may authorize service request 510, for example, based on one or more of the credentials and one or more rules stored by authorization server 240. In these implementations, authorization server 240 may indicate, to app server 230, information relating to the authorization of service request 510 in a service response 520. Further, service authorization server 240 may authorize service request 510 based on determining that the requested service, identified in service request 510, is authorized (e.g., accessible using the key). For example, service authorization server 240 may store a data structure that identifies services that are accessible via the key. An example of the data structure is described above with respect to FIG. 4.

If, for example, service authorization server 240 determines that the credentials are valid and the requested service is authorized, service authorization server 240 may authorize service request 510 and provide service request 510 to network provider server 220 (e.g., to cause network provider server 220 to provide service data, relating to service request 510, to app server 230).

If, for example, service authorization server 240 determines that the credentials are not valid, service authorization server 240 may provide an indication to app server 230 to direct app server 230 to request updated credentials and may prevent app server 230 from accessing network provider server 220. For example, app server 230 may request a token from a token generation server and provide the token to a credential updating server as part of a request to update the credentials. In some implementations, the credential updating server may receive the same token from the token generation server, and validate the request to update the credentials when the token, received from app server 230 matches the token received from the token generation server.

In FIG. 5, assume that service authorization server 240 determines that the credentials are valid, but that the requested service is not authorized (e.g., the requested service is not accessible using the key). Given these assumptions, service authorization server 240 may provide service response 520 to app server 230 and service authorization request 525 to management device 250. In some implementations, service response 520 may include an indication that the requested service is not authorized to be accessed via the key included in service request 510. In some implementations, service response 520 may also include an indication that authorization for the requested service may be pending and/or some other indication to notify a user of user device 210 that the requested service cannot be currently accessed.

In some implementations, app server 230 may receive service response 520 and may execute an instruction based on receiving service response 520. For example, app server 230 may execute an instruction to cause user device 210 to execute an application that may be used to provide a similar service to the requested service identified in service request 510.

In some implementations, service authorization request 525 may include a request for management device 250 to authorize the requested service such that the key can be used to access the requested service. In some implementations, service authorization request 525 may include pricing information associated with authorizing the request. For example, the pricing information may be based on network resources that are consumed when providing service data associated with the requested server.

In some implementations, management device 250 may receive service authorization request 525 and may provide service authorization instruction 530 based on receiving service authorization request 525. In some implementations, service authorization instruction 530 may include authorization parameters and an instruction to authorize (e.g., activate) the requested service to be accessed using the key. For example, as described above with respect to FIG. 4, the authorization parameters may include administrative credentials, information identifying a geographic location (e.g., based on a global position system (GPS) device associated with management device 250), an IP address, biometrics information, and/or some other information that can be used to validate that service authorization instruction 530 was received from an authorized party.

In some implementations, management device 250 may provide service authorization instruction 530 at any time to update services that may be accessed using a particular key. Further, service authorization instruction 530 may include an instruction to de-authorize (e.g., deactivate) a service from being accessed using the key (e.g., by disassociating the service from the key). In some implementations, app server 230 may function as management device 250 and may provide service authorization instruction 530 to service authorization server 240 to activate or deactivate a service associated with a particular key. For example, app server 230 may provide service authorization instruction 530 at any time to activate or restore a service that was deactivated, or to deactivate a service that was previously activated. In some implementations, app server 230 may receive service authorization request 525 and may provide service authorization instruction 530 to authorize a service to be associated with a key. For example, based on receiving service authorization request 525, app server 230 may direct user device 210 to present an option to authorize the service (e.g., for a fee, as identified by pricing information included in service authorization request 525).

In some implementations, service authorization server 240 may perform instruction validation function 535 based on receiving service authorization instruction 530. In some implementations, service authorization server 240 may perform instruction validation function 535 to validate that service authorization instruction 530 is received from an authorized party and/or from an authorized location. In some implementations, service authorization server 240 may validate authorization instruction 530 based on information stored by data structure 400. For example, service authorization server 240 may validate service authorization instruction 530 when the authorization parameters and the requested service, identified in service authorization instruction 530, match authorization parameters stored by authorization parameters field 430 and a service identified in authorized service updates field 440 of data structure 400.

As an example, assume that service authorization request 530 includes administrative credentials (e.g., username1/password1), information identifying the IP Address "123.123.001," information identifying a geographic location within a one kilometer radius of the longitude/latitude coordinates of "37.775, −122.421," and biometrics data corresponding to "Data Set 1." Further, assume that service authorization instruction 530 includes an instruction to update the requested service (e.g., Service 1) for the key (e.g. Key 123). Further, assume that authorization parameters field 430 stores the administrative credentials, username1/password, information identifying the IP Address "123.123.001," information identifying a geographic proximity within a one kilometer radius of the longitude/latitude coordinates of "37.775, −122.421," and biometrics data corresponding to "Data Set 1." Further, assume that authorized service updates field 440 stores information that identifies that Service 1 may be updated for Key 123. Given these assumptions, service authorization server 240 may validate service authorization request 530.

In some implementations, service authorization server 240 may determine the geographic location of management device 250 (e.g., when service authorization instruction 530 does not include the geographic location). For example, service authorization server 240 may determine the geographic location of management device 250 based on an IP address of management device 250, by performing domain name server (DNS) queries associated with the IP address to determine the geographic location of management device 250, by invoking a GPS device of management device 250, by receiving geographic location information from one or more networks to which management device 250 is attached (e.g., a mobile broadband network), and/or using some other technique. In some implementations, service authorization server 240 may use the information identifying the geographic location to validate service authorization instruction 530, as described above.

Based on validating service authorization request 530, service authorization server 240 may perform service data structure update function 540 to update an association between the requested service and the key. For example, service authorization server 240 may generate an association between the requested service and the key by storing information identifying the service in association with information identifying the key (e.g., by storing information identifying the requested service in an entry of application and key information field 410 that identifies the key). In some implementations, service authorization server 240 may delete an association between a service and key when service authorization request 530 includes an instruction to deactivate a service for the key.

As a result of performing service data structure update function 540, services that app server 230 may access may be updated without the need to modify the key embedded in the application, thereby eliminating the need to issue a new key associated with the services, embed the new key in the application, redeploy the application, retest the application, or perform some other task relating to updating the key embedded in the application that may be time-consuming and costly.

In some implementations, service authorization server 240 may provide service authorization notification 545 to app server 230 to notify app server 230 that the requested service has been authorized for the key embedded in the application associated with service authorization server 240. Based on receiving service authorization notification 545, app server 230 may provide service request 550 (e.g., identifying the key and the request service included in service request 510). In some implementations, service authorization server 240 may perform service authorization function 555 and authorize service request 550 based on performing service authorization function 555 (e.g., since the requested service is accessible using the key after service authorization server 240 performs service data structure update function 540). Based on authorizing service request 550, service authorization server 240 may provide service request 550 to network provider server 220. In some implementations, network provider server 220 may receive service request 550 and may provide service data 560 including data associated with the requested service identified by service request 550. In some implementations, app server 230 may receive service data 560 and provide service data 560 to user device 210 in response to an application instruction received from user device 210. In some implementations, service data 560 may include data associated with the application instruction (e.g., geographic mapping data, user device location data, and/or some other type of data associated with the application instruction).

While a particular series of operations and/or data flows have been described above with regards to FIG. 5, the order of the operations and/or data flows may be modified in other implementations. Further, non-dependent operations may be performed in parallel.

Figure 6:
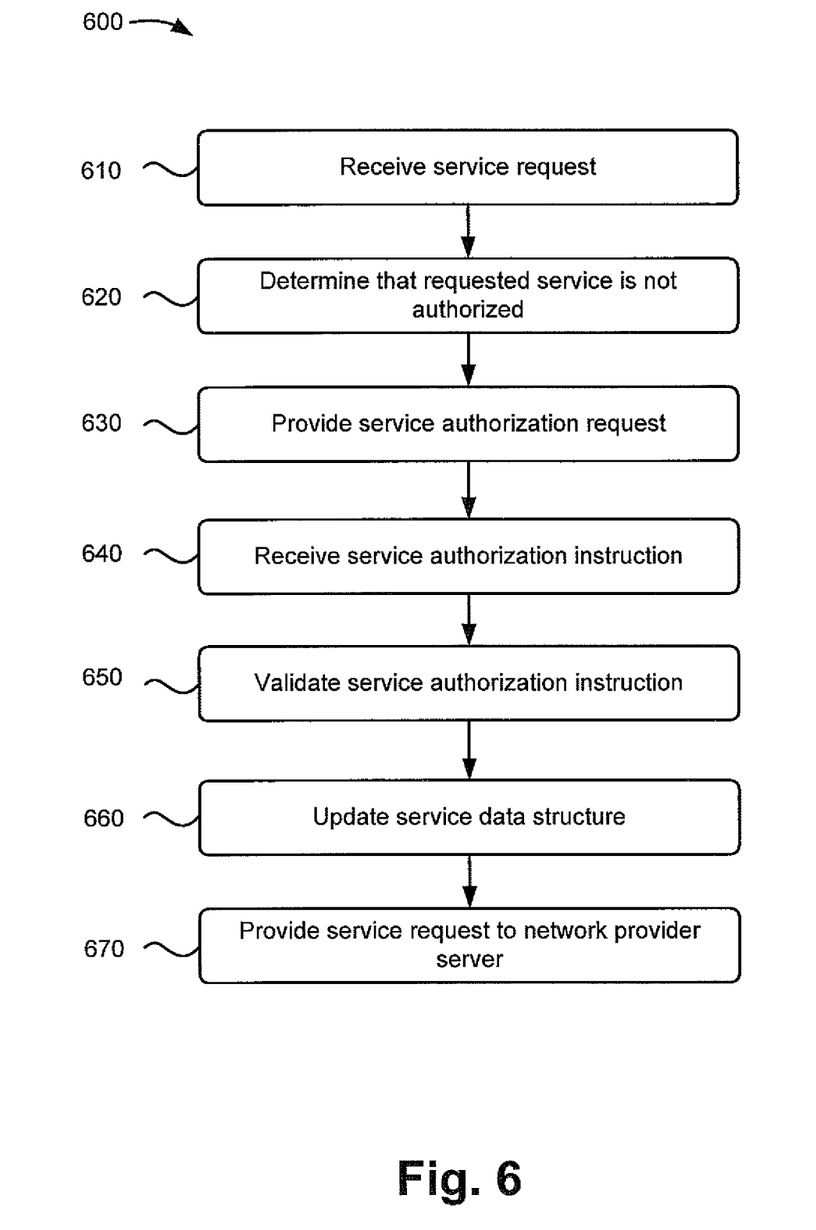
FIG. 6 illustrates a flowchart of an example process for updating a data structure identifying authorized services associated with a key.

FIG. 6 illustrates a flowchart of an example process 600 for updating a data structure identifying authorized services associated with a key. In one implementation, process 600 may be performed by one or more components of service authorization server 240. In another implementation, some or all of blocks of process 600 may be performed by one or more components of another device in environment 200 (e.g., network provider server 220, app server 230, and/or management device 250), or a group of devices including or excluding service authorization server 240.

As shown in FIG. 6, process 600 may include receiving a service request (block 610). For example, as described above with respect to service request 510, service authorization server 240 may receive the service request from app server 230 (e.g., when app server 230 receives an application instruction from user device 210, such as an instruction associated with performing a task via an application of user device 210 and associated with app server 230). In some implementations, the service request may identify a requested service corresponding to the application instruction (e.g., a geographic map service, a user device location service, etc.). In some implementations, the service request may include credentials and a key embedded within the application.

Process 600 may also include determining that the requested service is not authorized (block 620). For example, as described above with respect to service authorization function 515, service authorization server 240 may determine that the requested service is not authorized based on a data structure that identifies services authorized to be accessed via the key included in the service request.

Process 600 may further include providing a service authorization request (block 630). For example, as described above with respect to service authorization request 525, service authorization server 240 may provide the service authorization request to management device 250 based on determining that the requested service is not authorized. In some implementations, service authorization server 240 may provide the service authorization request further based on determining that credentials, included in the service request, are valid. In some implementations, the service authorization request may include a request to authorize the requested service for the key.

Process 600 may also include receiving a service authorization instruction (block 640). For example, as described above with respect to service authorization instruction 530, service authorization server 240 may receive the service authorization instruction from management device 250. In some implementations, service authorization server 240 may receive the service authorization instruction as a response to the service authorization request. Additionally, or alternatively, service authorization server 240 may receive the service authorization instruction at any time (unrelated to any service authorization request) to activate or deactivate a service associated with the key.

In some implementations, the service authorization instruction may include authorization parameters and an instruction to authorize/de-authorize (e.g., activate/deactivate) a service to be accessed using the key. For example, as described above with respect to FIG. 4, the authorization parameters may include administrative credentials, information identifying a geographic location (e.g., based on a global position system (GPS) device associated with management device 250), an IP address, biometrics information, and/or some other information that can be used to validate that the service authorization instruction was received from an authorized party.

Process 600 may further include validating the service authorization instruction (block 650). For example, as described above with respect to instruction validation function 535, service authorization server 240 may validate the service authorization instruction based on authorization parameters included in the service authorization instruction and information stored by authorization parameters field 430 and authorized service updates field 440. Examples of validating the service authorization instruction are described above with respect to data structure 400 and instruction validation function 535.

Process 600 may also include updating a service data structure (block 660). For example, as described above with respect to service data structure update function 540, service authorization server 240 may update a data structure that stores information identifying services that are authorized to be accessed via the key (e.g., to activate or deactivate a service) based on validating the service authorization instruction. In some implementations, service authorization server 240 may activate a service by generating an association between the service and the key by storing information identifying the service in association with information identifying the key (e.g., by storing information identifying the service in an entry of application and key information field 410 that identifies the key). In some implementations, service authorization server 240 may deactivate a service by deleting an association between the service and key.

Process 600 may further include providing the service request to a network provider server (block 670). For example, service authorization server 240 may provide the service request (e.g., the service request corresponding to the service request described in block 610) to service authorization server 240 based on updating the service data structure (e.g., since the service data structure, after being updated, includes information to authorize the service to be accessed via the key). In some implementations, network provider server 220 may receive the service request and provide service data to app server 230.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. For example, blocks 620-660 may be omitted when credentials included in the service request are valid and when the requested service, identified by the service request, is authorized. In some implementations, service authorization server 240 may receive a service authorization instruction at any time without providing a service authorization request and without receiving a service request. That is, blocks 610-630, and 670 may be omitted.

Figure 7A:
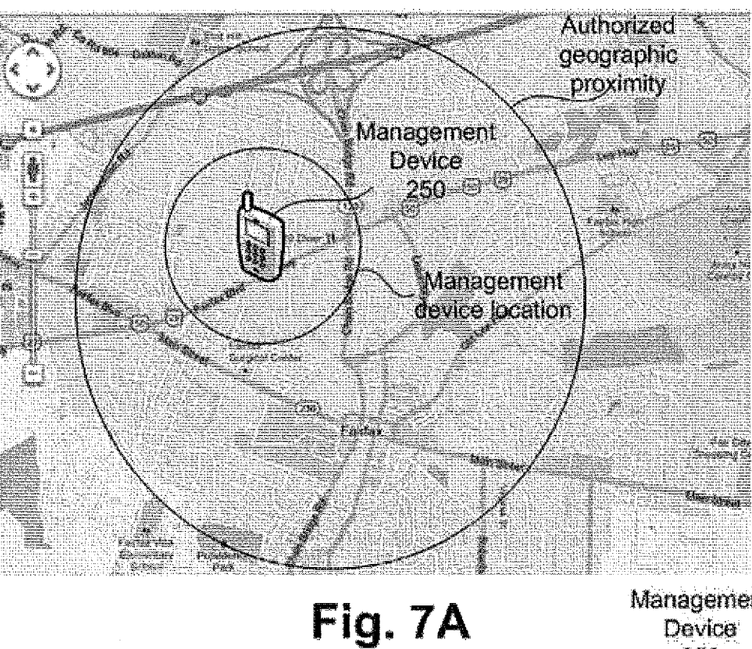
FIGS. 7A-7B illustrate an example implementation as described herein.
Figure 7B:
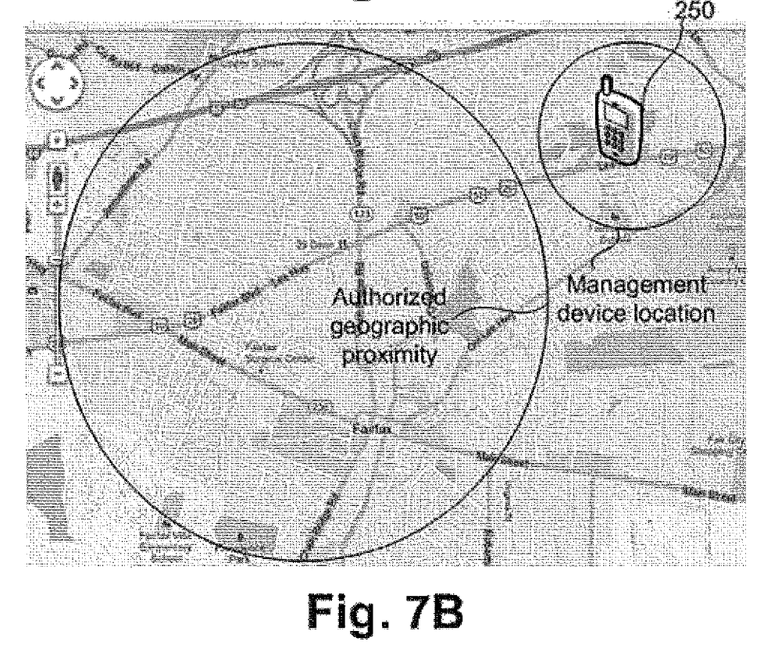

FIGS. 7A-7B illustrate an example implementation as described herein. In FIG. 7A, assume that management device 250 communicates with service authorization server 240 to provide a service authorization instruction. Further, assume that management device 250 provides, to service authorization server 240, valid administrative credentials, valid biometrics information, and/or a valid IP address credential (e.g., a username, a password, an IP address, and/or a set of biometrics information that matches information stored by authorization parameters field 430) as part of the service authorization instruction. Further, assume that service authorization server 240 stores information (e.g., in authorization parameters field 430) to identify an authorized geographic proximity (e.g., longitude/latitude coordinates to identify a center geographic location, and a radius).

In some implementations, service authorization server 240 may determine whether management device 250 is located in a geographic location that is within the authorized geographic proximity. For example, service authorization server 240 may determine the geographic location of management device 250 based on an IP address of management device 250, by performing DNS queries associated with the IP address to determine the geographic location of management device 250, by invoking a GPS device of management device 250, by receiving geographic location information from one or more networks to which management device 250 is attached (e.g., a mobile broadband network), and/or using some other technique. In FIG. 7A, assume that service authorization server 240 determines that management device 250 is located in a geographic location that is within the authorized geographic proximity. Given the above assumptions, service authorization server 240 may validate the service authorization instruction and update a service data structure in accordance with the service authorization instruction, as described above.

Referring to FIG. 7B, assume that service authorization server 240 receives a service authorization instruction from management device 250 and that service authorization server 240 determines that management device 250 is not located in a geographic location that is within the authorized geographic proximity. Given these assumptions, service authorization server 240 may not validate the service authorization instruction even if management device 250 provides a valid administrative credential, a valid IP address, valid biometrics information and/or other information that may match information stored by authorization parameters field 430. In some implementations, authorization parameters field 430 may include information to identify whether service authorization server 240 may validate a service authorization instruction when service authorization device 240 is partially in the authorized geographic proximity (e.g., based on security permissions information determined by an operator of service authorization server 240).

While a particular example is shown in FIGS. 7A-7B, the above description is merely an example implementation. In practice, other examples are possible from what is described above in FIGS. 7A-7B.

Figure 8:
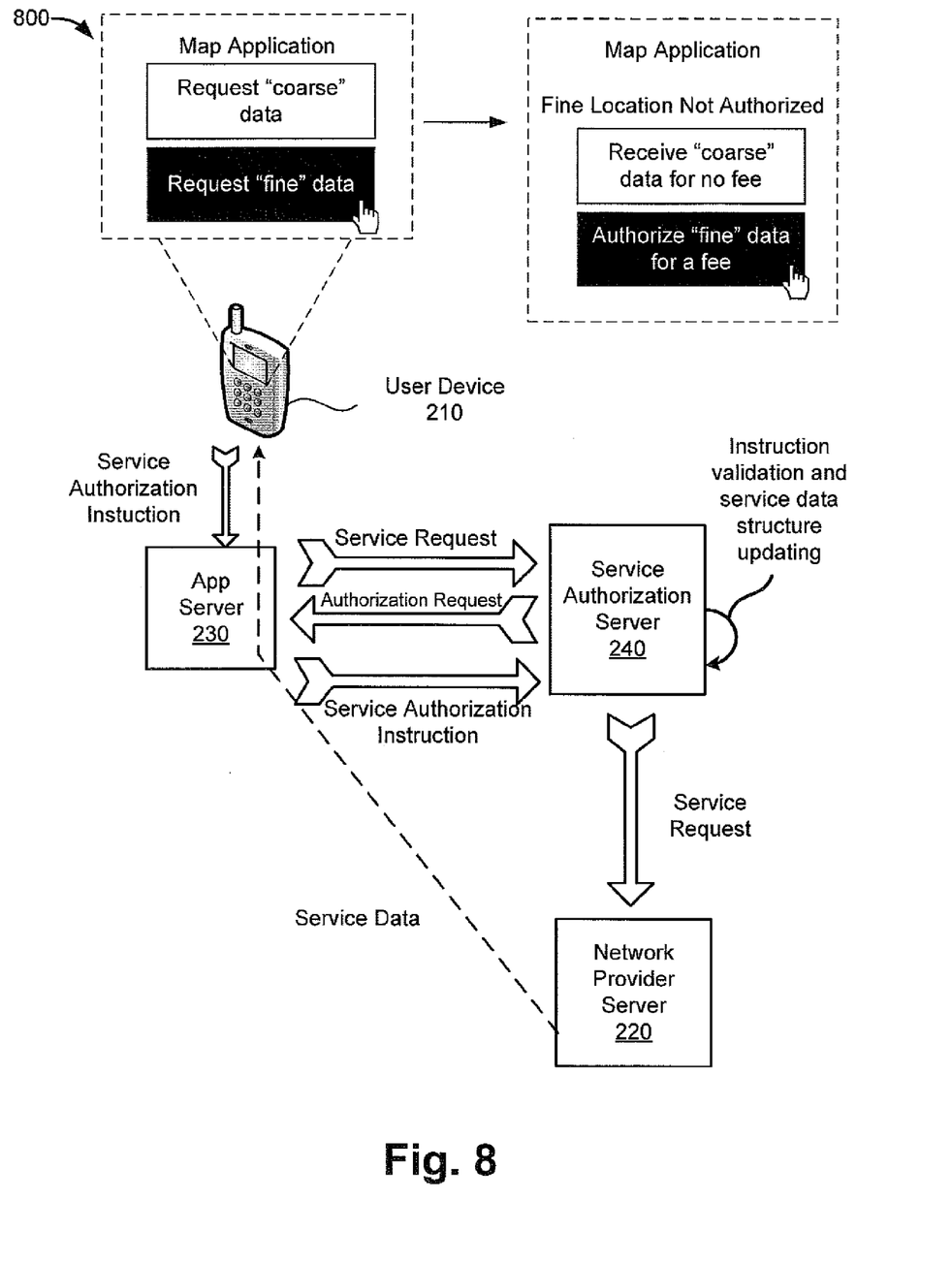
FIG. 8 illustrates an example implementation as described herein.

FIG. 8 illustrates an example implementation as described herein. In FIG. 8, assume that user device 210 includes an application to receive geographic mapping data. Further, as shown in interface 800, assume that the application provides an option to receive either "coarse" mapping data, or "fine" mapping data (e.g., geographic mapping data having additional information in relation to the "coarse" mapping data, such as additional point-of-interest details, additional details regarding streets, additional user controls, etc.) Further, assume that user device 210 provides an application instruction to receive "fine" mapping data via a geographic mapping application associated with app server 230 (e.g., based on receiving a selection for the "fine" mapping data). Further, assume that the service data, corresponding to the "fine" mapping data, is not authorized to be accessed using a key, embedded in the application. Given these assumptions, app server 230 may provide a service request, identifying the key and the requested service, towards network provider server 220 to request service data corresponding to the application instruction.

In some implementations, service authorization server 240 may receive the service request, determine that the requested service is not authorized to be accessed via the key, and provide a service authorization request to app server 230. In some implementations, the service authorization request may include information identifying a fee associated with authorizing the requested service, and may further include information identifying that service data for the "coarse" mapping data is authorized to be accessed.

In some implementations, app server 230 may present an option to user device 210 to authorize the requested service for the fee (e.g., in order to establish an association between the requested service and the key) or to receive the authorized service data (e.g., the "coarse" mapping data) for no fee. In FIG. 8, assume that user device 210 receives a selection to authorize the requested service. Given these assumptions, user device 210 may provide a service authorization instruction to authorize the requested service to be associated with the key. In some implementations, app server 230 may provide the service authorization instruction to service authorization server 240. In some implementations, app server 230 may insert authentication credentials prior to providing the service authorization instruction to service authorization server 240. Additionally, or alternatively, user device 210 may provide the authorization credentials when providing the service authorization instruction to app server 230.

In some implementations, service authorization server 240 may validate the service authorization instruction and may update a data structure to reflect that the requested service is authorized to be accessed using the key. In some implementations, the service authorization instruction may include an instruction to de-authorize the requested service after a particular amount of time (e.g., for when the requested service is to be temporarily authorized in order to control costs associated with authorizing the requested service).

In some implementations, service authorization server 240 may provide the service request to network provider server 220 to cause network provider server 220 to provide service data, corresponding to the requested service, to app server 230. In some implementations, app server 230 may provide the service data to user device 210 such that user device 210 may display the "fine" mapping data on a user interface of user device 210.

While a particular example is shown in FIG. 8, the above description is merely an example implementation. In practice, other examples are possible from what is described above in FIG. 8. Also, while a particular format of interface 800 is shown, in practice, interface 800 may have a different format and appearance than what is shown in FIG. 8.

As described above, information identifying service data that app server 230 may access may be updated without the need to modify the key embedded in an application, thereby eliminating the need to issue a new key, embed the new key in the application, redeploy the application, retest the application, or perform some other task relating to updating the key embedded in the application that may be time-consuming and costly. Further, a service authorization instruction may be validated based on biometrics information, IP address information, geographic location information, and/or some other authorization parameters to ensure that the authorization instruction is received from an authorized party.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a service authorization server, a service request,
      the service request including a key and a request for a service;
   providing, by the service authorization server, a service authorization request to a management server based on receiving the service request;
   receiving, by the service authorization server, a service authorization instruction from the management server based on providing the service authorization request,
      the service authorization instruction including one or more authorization parameters and an instruction to associate or disassociate the key with the service to permit or prevent the service to be accessed using the key, and
      the key being embedded in an application used to provide an application instruction corresponding to the request for the service;
   validating, by the service authorization server, the service authorization instruction based on the one or more authorization parameters;
   updating, by the service authorization server and based on validating the service authorization instruction, information identifying services that are accessible using the key to permit or prevent the service to be accessed using the key without modifying the key embedded in the application; and
   providing, by the service authorization server and when the information identifying the services that are accessible using the key is updated to permit the service to be accessible using the key, the request for the service to a network provider server to cause the network provider server to provide service data associated with the service.

2. The method of claim 1, where providing the service authorization request comprises:
   determining, after receiving the service request, that the service is not permitted to be accessed using the key based on the information identifying the services that are accessible using the key, and
   providing the service authorization request to the management server based on determining that the service is not permitted to be accessed using the key.

3. The method of claim 1, where the service request is a first service request, and
   where, when the information identifying the services that are accessible using the key is updated to permit the service to be accessible using the key, the method further comprises:
      providing a notification to an application server that the service is accessible using the key;
      receiving a second service request based on providing the notification,
         the second service request including the key and the request for the service;
      determining that the service is accessible using the key based on the information identifying the services that are accessible using the key; and
      providing, based on determining that the service is accessible using the key, the second service request to the network provider server to cause the network provider server to provide the service data, associated with the service, to the application server.

4. The method of claim 1,
   where the service request includes credentials, and
   where the method further comprises:
      determining that the credentials are not valid; and
      directing the management server to update credentials based on determining that the credentials are not valid.

5. The method of claim 1, where validating the service authorization instruction includes determining that the one or more authorization parameters and the service, identified in the service authorization instruction, match other information stored by the service authorization server that identifies whether the service authorization instruction is valid.

6. The method of claim 1, where the one or more authorization parameters include information identifying a geographic location, a password, an identifier of a user, an internet protocol address via which the service authorization instruction is received, a computer file, or biometrics information.

7. The method of claim 1, where the service authorization instruction is based on a selection for the service via the application.

8. A system comprising:
a service authorization server, implemented at least partially in hardware, to:
receive a service request,
the service request including a key and a request for a service,
provide a service authorization request to a management server based on receiving the service request,
receive a service authorization instruction from the management server based on providing the service authorization request,
the service authorization instruction including one or more authorization parameters and an instruction to associate or disassociate the key with the service to permit or prevent the service to be accessed using the key, and
the key being embedded in an application used to provide an application instruction corresponding to the request for the service;
validate the service authorization instruction based on the one or more authorization parameters;
update, based on validating the service authorization instruction, information identifying services that are accessible using the key to permit or prevent the service to be accessed using the key without modifying the key embedded in the application; and
provide, based on when the information identifying the services that are accessible using the key is updated to permit the service to be accessible using the key, the request for the service to a network provider server to cause the network provider server to provide service data associated with the service.

9. The system of claim 8,
wherein the service authorization server, when providing the service authorization request,
determines that the service is not accessible using the key, and
provides the service authorization request to the management server based on determining that the service is not accessible using the key.

10. The system of claim 8, where, when updating the information identifying the services that are accessible using the key, the service authorization server is to:
associate the key with the service to permit the service to be accessible using the key.

11. The system of claim 8,
where the service request is a first service request, and
where the service authorization server is further to:
determine that the service is accessible using the key;
provide a notification that the service is accessible using the key;
receive a second service request based on providing the notification,
the second service request including the key and the request for the service;
determine, based on receiving the second service request, that the service is accessible using the key based on associating the key with the service;
authorize the second service request based on determining that the service is accessible using the key; and
provide the second service request to the network provider server based on authorizing the second service request.

12. The system of claim 8, where the service request includes credentials, and where the service authorization server is further to:
determine that the credentials are not valid; and
direct an application server to update the credentials based on determining that the credentials are not valid.

13. The system of claim 8, wherein the service authorization server, when validating the service authorization instruction,
determines that the one or more authorization parameters and the service, identified in the service authorization instruction, match other information stored by the service authorization server that identifies whether the service authorization instruction is valid.

14. The system of claim 8, where the one or more authorization parameters include:
other information identifying a geographic location from which the service authorization instruction is received,
a password of a user,
an identifier of the user,
an address via which the service authorization instruction is received,
a computer file, or
biometrics information associated with the user.

15. A non-transitory computer-readable medium storing instructions, the instructions comprising:
a plurality of instructions which, when executed by one or more processors associated with a service authorization server, cause the one or more processors to:
receive a service request,
the service request including a key and a request for a service,
provide a service authorization request to a management server based on receiving the service request,
receive a service authorization instruction from the management server based on providing the service authorization request,
the service authorization instruction including one or more authorization parameters and an instruction to associate or disassociate the key with the service to permit or prevent the service to be accessed using the key, and
the key being embedded in an application used to provide an application instruction corresponding to the request for the service;
validate the service authorization instruction based on the one or more authorization parameters;
update, based on validating the service authorization instruction, information identifying services that are accessible using the key to permit or prevent the service to be accessed using the key without modifying the key embedded in the application; and
provide, based on when the information identifying the services that are accessible using the key is updated to permit the service to be accessible using the key, the request for the service to a network provider server to cause the network provider server to provide service data associated with the service.

16. The non-transitory computer-readable medium of claim 15, where one or more instructions, of the plurality of instructions, to update the information identifying the services that are accessible using the key cause the one or more processors to associate the key with the service to permit the service to be accessible using the key.

17. The non-transitory computer-readable medium of claim 16, where the service request is a first service request, and
where the instructions further comprise one or more instructions to:

provide a notification that the service is accessible using the key based on associating the key with the service;

receive a second service request based on providing the notification,
the second service request including the key and the request for the service;

determine that the service is accessible using the key based on associating the key with the service;

authorize the second service request based on determining that the service is accessible using the key; and provide the second service request to the network provider server based on authorizing the second service request.

18. The non-transitory computer-readable medium of claim 15, where the one or more authorization parameters include:

other information identifying a geographic location from which the service authorization instruction is received, a password of a user, an identifier of the user, an address via which the service authorization instruction is received, a computer file, or biometrics information associated with the user.

19. The non-transitory computer-readable medium of claim 15, where the service data corresponds to coarse mapping data.

20. The method of claim 1, where the service data corresponds to fine mapping data that requires a fee to be accessed.

* * * * *